United States Patent [19]
Gallego

[11] Patent Number: 5,765,507
[45] Date of Patent: Jun. 16, 1998

[54] ANIMAL BATH

[75] Inventor: Elena P. Gallego, Alpine, Tex.

[73] Assignee: Jones, Day, Reavis & Pogue, Dallas, Tex.

[21] Appl. No.: 615,024

[22] Filed: Mar. 13, 1996

[51] Int. Cl.$^6$ ............................................. A01K 13/00
[52] U.S. Cl. ......................... 119/651; 119/675; 119/676
[58] Field of Search ................................ 119/603, 651, 119/673, 675, 676; 220/323, 324, 697, 700, 735, 736

[56] References Cited

U.S. PATENT DOCUMENTS

| | | | |
|---|---|---|---|
| 1,163,836 | 12/1915 | Long | 220/323 |
| 2,151,895 | 3/1939 | Carlson | 220/697 |
| 2,536,943 | 1/1951 | Kessel | 119/676 |
| 3,263,653 | 8/1966 | Miller | 119/673 |
| 3,941,092 | 3/1976 | Winters | 119/673 X |
| 4,083,328 | 4/1978 | Baker | 119/673 |
| 5,279,257 | 1/1994 | Temby | 119/676 |
| 5,309,866 | 5/1994 | Santoro | 119/675 X |

FOREIGN PATENT DOCUMENTS

| | | | |
|---|---|---|---|
| 467437 | 6/1914 | France | 119/158 |

Primary Examiner—Robert P. Swiatek
Assistant Examiner—Elizabeth Shaw
Attorney, Agent, or Firm—Jones, Day, Reavis & Pogue

[57] ABSTRACT

An animal bath including a container for holding bathwater and having an open top portion in which an animal can be placed and having a lid for sealing the open top portion of the container. A first opening in the lid permits the head of an animal to project outside the sealed container and a second opening in the lid enables the person bathing the animal to extend an arm into the container.

12 Claims, 1 Drawing Sheet

ANIMAL BATH

BACKGROUND OF THE INVENTION

1. Field of the Invention

The present invention relates in general to bathing containers and specifically to an animal bath container that is in the form of a pail having a lid thereon with first and second openings therein through one of which the head of the animal can project while the animal body is immersed in the bathing fluid in the pail. The other opening is used for the insertion of the arm of the person bathing the animal.

2. Description of Related Art Including Information Disclosed Under 37 CFR 1.97 and 1.98

Animals are generally bathed in a container such as a washtub. It is well known that many animals such as cats and dogs have an aversion to having a bath and, therefore, resist being placed into the washtub or other container and further cause a great deal of splashing of the bathwater externally of the container in which the bath is being given.

It would be advantageous to have a container so constructed that the animal could be placed in the container without the typical resistance and in which, after the animal is placed therein, the top thereof could be sealed to prevent the mess created by the bathwater being splashed outside of the container, not only in the surrounding area but on the individual trying to bath the animal.

SUMMARY OF THE INVENTION

The present invention overcomes the disadvantages of the prior art by providing a novel container that can be sealed during the bathing of the animal and which has a lid that is so constructed that it can be used to place the animal in the container without the typical resistance provided by the animal to being bathed.

The present invention includes a container in the form of a pail in the preferred embodiment that has a cover or lid therefor which can be removably attached to the container or pail. The lid is constructed with first and second openings therein. To give the animal a bath, its legs and body are first wrapped with a towel and then the head of the animal is inserted through one of the openings in the lid. The animal is then placed in the container that has been filled with bathwater to the proper level. The lid is attached to the pail or container with quick disconnects such that only the animal's head is protruding from the container through the opening in the lid. The person giving the animal the bath extends an arm through the other opening, removes the towel from the body of the animal and bathes the animal with the arm extended through the other opening. Since the lid prevents the animal from seeing the container, the towel may be removed from the animal's body before the animal is placed in the bathwater in the container.

One of the openings in the lid can be made larger than the other to accommodate either the head of a larger animal or the arm of the person giving the bath, depending upon the need.

Further, a plurality of indicia are placed on the inside of the container at spaced vertical intervals to indicate the proper bathwater level for animals of varying weight. A handle is attached to the container for appropriate handling of the container. Generally speaking, the openings in the lid are made circular in shape and have circumferential edges that are covered with appropriate materials such as plastic or are beveled, as is well known in the art, to prevent injury to either the animal or the person giving the bath.

Thus, it is an object of the present invention to provide an animal bath that overcomes the disadvantages of the prior art.

It is also an object of the present invention to provide an animal bath in the form of a pail having a lid thereon and removably attached thereto and which has first and second openings therein. The head of the animal can be inserted through one of the openings so that the head protrudes from the lid when the animal is placed in the pail and the lid attached thereto. The other opening is used for the individual to place the arm therein and give the animal a bath.

It is still another object of the present invention to provide the plurality of indicia on the inside of the container at spaced vertical intervals to indicate the proper bathwater level for animals of varying weight.

It is a further object of the present invention to provide first and second openings in the lid for the container and wherein the first opening is larger than the second opening.

Thus, the present invention relates to an animal bath for enabling a person to bath an animal, the bath comprising a container for holding bathwater and having an open top portion in which an animal can be placed into the container, a lid for sealing the open top portion of the container, a first opening in the lid for permitting the head of an animal to project outside of the sealed container, and a second opening in the lid for receiving an arm of the person bathing the animal to enable the person to bathe the animal with the bathwater.

The invention also relates to a method of bathing an animal comprising the steps of filling a container with bathwater sufficient to bathe the animal, providing a lid for the container, the lid having first and second spaced openings therein, wrapping the animal's body and legs in a soft, resilient material (such as a towel) to confine the legs of the animal, inserting the animal's head through one of the openings in the container lid, removing the wrapping material from the body and legs of the animal, placing the body and legs of the animal in the bathwater in the container, attaching the container lid to the container, and bathing the animal using the other one of the openings.

BRIEF DESCRIPTION OF THE DRAWINGS

These and other features of the present invention will be more fully disclosed in the following DETAILED DESCRIPTION OF THE PREFERRED EMBODIMENT(S) in which like numerals represent like elements and in which.

DETAILED DESCRIPTION OF THE PREFERRED EMBODIMENT(S)

Figure 1:
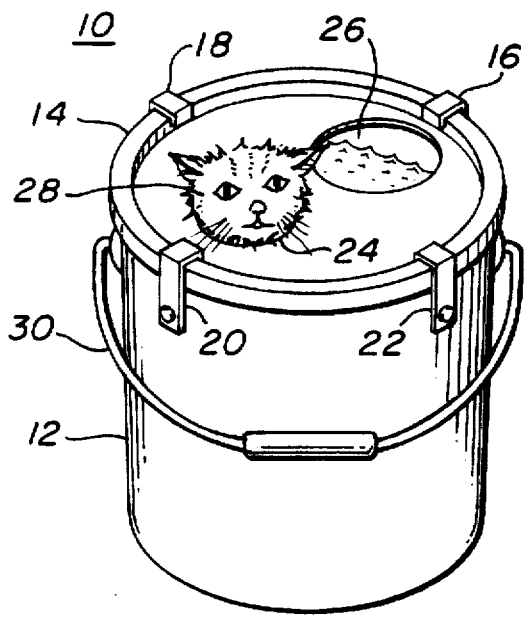
FIG. 1 is a perspective view of the novel animal bath illustrating the lid on the container and the head of the animal, in this case a kitten, protruding from one of the openings in the lid and the other opening being available for the arm of a person to bathe the animal.

FIG. 1 is an isometric view of the animal bath container of the present invention and wherein the container 10 is shown to include a body portion 12, which may be in the form of a pail, and a lid portion 14. The lid portion 14 is removably attached to the pail or body portion 12 by means of quick disconnects 16, 18, 20, and 22. The quick disconnects 16–22 may be of any type well known in the art and are not critical in design. Openings 24 and 26 are shown formed in the lid 14, one of which is larger than the other as can be best seen in FIG. 2B. The animal's head 28, in this case a kitten, is shown projecting from the opening 24 in the lid 14. The person giving the bath can insert an arm through the opening 26 to use the bathwater therein to bathe the kitten 28. A handle 30 may be attached to the pail to provide an easy method of transporting the bath container 10 from place to place.

Figure 2A:
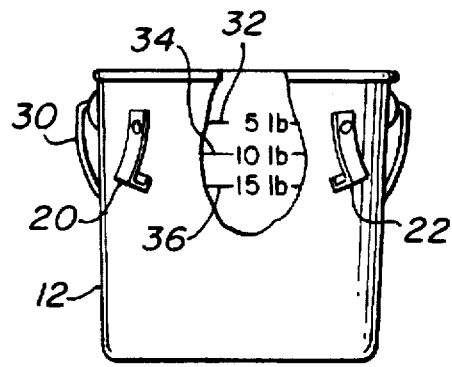
FIG. 2A is a side view of the pail with a portion of the side removed to illustrate indicia on the inside of the container at spaced vertical intervals to indicate the proper bathwater level for animals of varying weight.

FIG. 2A is a side view of the pail 12 with a portion thereof cut away to illustrate a plurality of indicia 32, 34, and 36 on the inside of the container at spaced vertical intervals to indicate the proper bathwater level for animals of varying weight. Thus, for example, the larger the animal, the less water that can be in the pail. Thus, indicia 32 may indicate the level of water for a 5-pound animal, indicia 34 may indicate the water level for a 10-pound animal, and indicia 36 may indicate the proper water level for a 15-pound animal.

The edges 38 and 40 of the openings 24 and 26 may be beveled or otherwise protected with a plastic covering in any well-known manner to cover sharp edges and to protect the neck and head of the animal as well as the arm of the person giving the animal a bath.

Figure 2B:
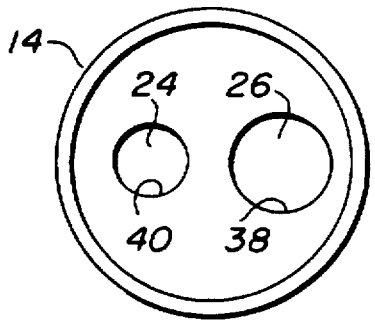
FIG. 2B is a top view of the lid of the container illustrating the first and second openings therein with the first opening being larger than the second opening and wherein the openings are shown to be circular in shape.
Figure 3:
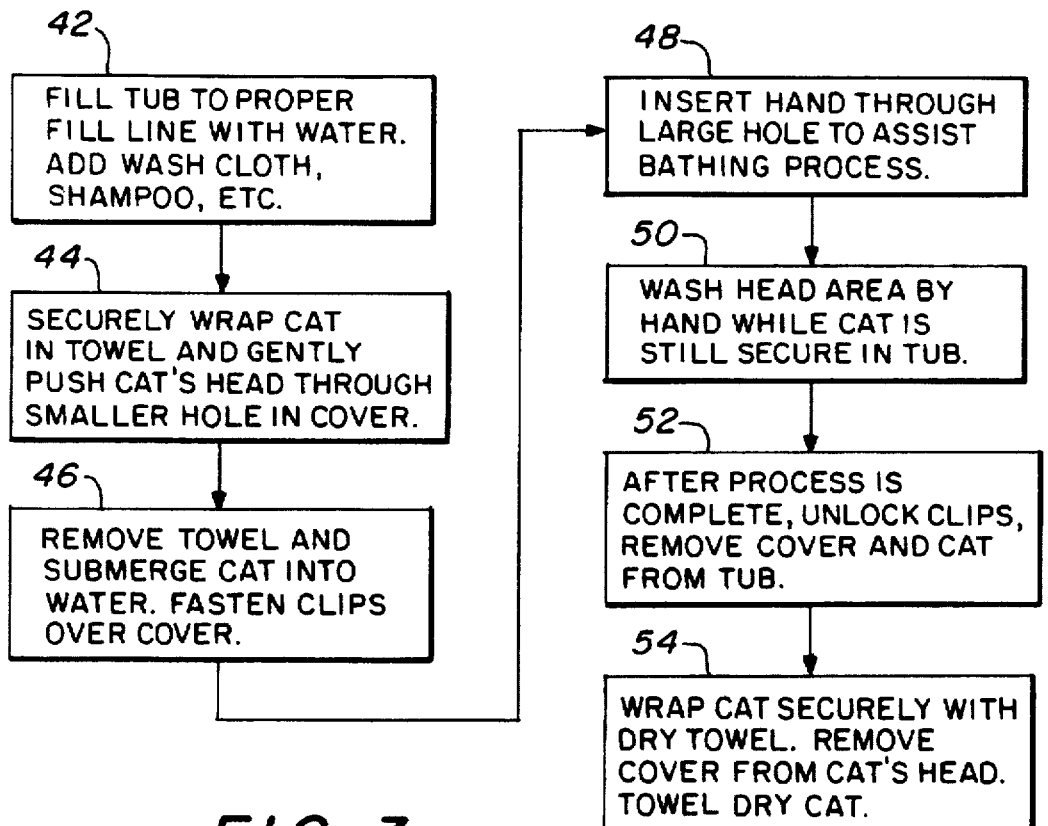
FIG. 3 is a flow chart illustrating the novel method of the present invention.

FIG. 3 illustrates a flow chart setting forth the steps necessary for providing the animal a bath with the novel container of the present invention illustrated in FIGS. 1 and 2A and 2B.

At step 42, the container or tub 12 is filled to the proper indicia fill line 32, 34, or 36 with bathwater. A wash cloth, shampoo, and brush or whatever is needed to give the bath may also be placed inside the container or tub 12.

At step 44, the animal is securely wrapped in a towel and the head of the animal is gently pushed through one of the openings 24 and 26 in the lid or cover 14.

It has been found that with most of the smaller animals that will be given a bath, that once their head has been placed in the lid opening 24 or 26, they will remain quiet and thus the towel can be removed at step 46 and the cat or animal submerged into the water. The lid or cover 14 can then be attached to the container 12 with quick-disconnect clips 16, 18, 20, and 22. The towel may be left around the animal, if necessary, until the animal is placed in the bathwater in container 12.

At step 48, the person giving the bath can insert their hand through the other opening 24 or 26 to assist in the bathing process.

If desired, the head area of the animal may be washed by hand at step 50 while the animal is still secure in the container 12 with the head 28 protruding through one of the openings as shown in FIG. 1.

After the bathing process is completed, the quick-disconnect clips 16–22 may be removed at step 52 and the cover removed from the container and the animal lifted out of the container.

At step 54, the animal can be securely wrapped with a soft, resilient material such as a towel and the lid 14 can be removed from the animal's head 28. The animal can then be dried with the soft, resilient material or towel.

As stated earlier, if the animal is one that will not hold still when the towel is removed at step 46, the towel may be left around the body and legs of the animal while the animal is inserted in the pail or container 12. The towel can then be removed through the other opening 24 or 26.

Thus there has been disclosed a novel animal bath that includes a container such as a pail having a detachable lid in which two spaced openings are formed. The head of the animal may be placed through one of the openings in the lid and then the animal placed in the container and the lid attached securely to the container. The person bathing the animal may then extend an arm through the other opening and bathe the animal. Thus this system prevents undue movement and splashing by the animal during the bathing process.

While the invention has been described in connection with a preferred embodiment, it is not intended to limit the scope of the invention to the particular form set forth, but, on the contrary, it is intended to cover such alternatives, modifications, and equivalents as maybe included within the spirit and scope of the invention as defined by the appended claims.

I claim:

1. An animal bath for enabling a person to bathe an animal, the bath comprising:

a substantially rigid container for holding bathwater and having an open top portion in which an animal can be placed;

a substantially rigid lid for sealing the open top portion of the container;

a first opening in the substantially rigid lid sized to permit the head of an animal to be inserted therein prior to placing the animal into the container and allowing the animal's head to project outside the container when the animal is placed in the container; and a second opening in the lid sized to receive an arm of the person bathing the animal to enable the person to bathe the animal with the bathwater in the container.

2. An animal bath as in claim 1 further including attachment devices for fixedly attaching said substantially rigid lid to said open top portion of said substantially rigid container.

3. An animal bath as in claim 2 wherein said attachment devices are quick release clips.

4. An animal bath as in claim 1 further including a plurality of indicia on the inside of said substantially rigid container at spaced vertical intervals to indicate the proper bathwater level for animals of varying weight.

5. An animal bath as in claim 1 wherein said first opening is larger than said second opening.

6. An animal bath as in claim 5 wherein said openings are circular in shape.

7. An animal bath as in claim 1 further including a handle attached to said substantially rigid container for carrying said container.

8. A method of bathing an animal comprising the steps of:

filling a container with bathwater sufficient to bathe said animal;

providing a lid for said container, the lid having first and second spaced openings therein;

wrapping the animal body and legs in a soft, resilient material to confine the legs of the animal;

inserting the animal's head through one of said openings in said container lid;

placing the body and legs of the animal in the bathwater in the container;

attaching the container lid to the container; and bathing said animal using the other one of said openings.

9. The method of claim 8 further comprising the steps of providing a plurality of indicia on the inside of said container at spaced vertical intervals to indicate the proper bathwater level for animals of different weights.

10. The method of claim 8 further comprising the step of forming said first opening larger than said second opening.

11. The method of claim 10 further comprising the step of forming said openings with a circular shape.

12. The method as in claim 8 further comprising the step of attaching a handle to said container for carrying said container.

* * * * *